(12) United States Patent
Cartwright

(10) Patent No.: US 10,009,475 B2
(45) Date of Patent: Jun. 26, 2018

(54) PERCEPTUALLY CONTINUOUS MIXING IN A TELECONFERENCE

(71) Applicant: DOLBY LABORATORIES LICENSING CORPORATION, San Francisco, CA (US)

(72) Inventor: Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 79 days.

(21) Appl. No.: 15/121,744

(22) PCT Filed: Feb. 17, 2015

(86) PCT No.: PCT/US2015/016095
§ 371 (c)(1),
(2) Date: Aug. 25, 2016

(87) PCT Pub. No.: WO2015/130508
PCT Pub. Date: Sep. 3, 2015

(65) Prior Publication Data
US 2017/0070615 A1      Mar. 9, 2017

Related U.S. Application Data

(60) Provisional application No. 61/946,042, filed on Feb. 28, 2014.

(51) Int. Cl.
*H04M 3/42* (2006.01)
*H04M 3/56* (2006.01)
(Continued)

(52) U.S. Cl.
CPC ............. *H04M 3/568* (2013.01); *G10L 25/51* (2013.01); *G10L 25/78* (2013.01); *H04M 3/569* (2013.01)

(58) Field of Classification Search
CPC ......... H04M 3/568; H04M 3/56; G10L 25/51; G10L 25/78
(Continued)

(56) References Cited

U.S. PATENT DOCUMENTS

| 4,648,108 A | 3/1987 | Ellis |
| 7,006,617 B1 | 2/2006 | Dal Farra |

(Continued)

FOREIGN PATENT DOCUMENTS

| JP | 11-088513 | 3/1999 |
| JP | 2002-176503 | 6/2002 |

(Continued)

OTHER PUBLICATIONS

Smith, Paxton J. "Voice Conferencing over IP Networks" Department of Electrical and Computer Engineering, McGill University, Montreal, Canada, Jan. 2002, pp. 1-140.

(Continued)

*Primary Examiner* — Thjuan K Addy

(57) ABSTRACT

In an audio teleconference mixing system, of the type mixing a first plurality of audio uplink input streams containing audio information including sensed audio and associated control information, to produce at least one audio downlink output stream for downlinking to at least one conference participants, wherein the audio uplink input streams potentially can include continuous transmission (CTX) and discontinuous transmission streams (DTX), a method of mixing multiple current audio uplink streams together to produce the at least one audio output stream, the method including the steps of: (a) determining a verbosity measure indicative of the likely importance of each current audio uplink streams; (b) where at least one current audio
(Continued)

uplink stream can comprise a CTX stream, utilizing at least one CTX stream in the mix to produce at least one current downlink output stream.

16 Claims, 3 Drawing Sheets

(51) Int. Cl.
  *G10L 25/51* (2013.01)
  *G10L 25/78* (2013.01)
(58) Field of Classification Search
  USPC ............ 379/202.01, 203.01, 201.01, 204.01,
  379/88.01, 392.01; 370/352
  See application file for complete search history.

(56) References Cited

U.S. PATENT DOCUMENTS

| | | |
|---|---|---|
| 8,305,939 B2 | 11/2012 | Chen |
| 8,331,585 B2 | 12/2012 | Hagen |
| 8,447,023 B2 | 5/2013 | Nimri |
| 2005/0122389 A1 | 6/2005 | Miao |
| 2008/0159507 A1 | 7/2008 | Virolainen |
| 2008/0162127 A1 | 7/2008 | Laaksonen |
| 2008/0304429 A1 | 12/2008 | Bevin |
| 2011/0038362 A1* | 2/2011 | Vos ........................ G10L 19/012 370/352 |
| 2011/0135078 A1 | 6/2011 | Soo |
| 2012/0039219 A1 | 2/2012 | Elwood |
| 2013/0077538 A1 | 3/2013 | Plotnikov |
| 2013/0191485 A1 | 7/2013 | Spencer |
| 2015/0244868 A1 | 8/2015 | Cartwright |
| 2015/0296086 A1 | 10/2015 | Eckert |

FOREIGN PATENT DOCUMENTS

| | | |
|---|---|---|
| JP | 2005-269347 | 9/2005 |
| JP | 2013-509841 | 3/2013 |
| WO | 03/039069 | 5/2003 |
| WO | 2008/082375 | 7/2008 |
| WO | 2011/018362 | 2/2011 |
| WO | 2011/055170 | 5/2011 |
| WO | 2013/142731 | 9/2013 |
| WO | 2015/130509 | 9/2015 |

OTHER PUBLICATIONS

Smith, P. et al "Speaker Selection for Tandem-Free Operation VOIP Conference Bridges" Proc. IEEE Workshop Speech Coding (Tsukuba, Japan), pp. 120-122, Oct. 2002.

Colm, E. et al "Synchronization of Speaker Selection for Centralized Tandem Free VoIP Conferencing" Proc. Interspeech, pp. 633-636, Oct. 2004.

* cited by examiner

PERCEPTUALLY CONTINUOUS MIXING IN A TELECONFERENCE

CROSS-REFERENCE TO RELATED APPLICATIONS

This application claims priority to U.S. Provisional Application No. 61/946,042 filed on 28 Feb. 2014 and entitled "Perceptually Continuous Mixing in a Teleconference," which is hereby incorporated by reference.

FIELD OF THE INVENTION

The present invention relates to the field of audio teleconferencing, and, in particular, discloses a method for mixing a plurality of audio streams in audio teleconferencing.

BACKGROUND OF THE INVENTION

Any discussion of the background art throughout the specification should in no way be considered as an admission that such art is widely known or forms part of common general knowledge in the field.

Video and audio teleconferencing systems where multiple parties interact remotely to carry out a conference are an important resource. Many such systems are known. Most rely on a central or distributed server resource to ensure each participant is able to hear and/or see the other participants using, for example, dedicated teleconferencing devices, standard computer resources with audio/input output facilities or Smart Phone type devices. The central or distributed server resource is responsible for appropriately mixing uplinked audio signals together from each conference participant and downlink the audio signals for playback by each audio output device.

By way of background, in a typical (known) teleconferencing system a mixer receives a respective 'uplink stream' from each of the telephone endpoints, which carries an audio signal captured by that telephone endpoint, and sends a respective 'downlink stream' to each of the telephone endpoints; thus each telephone endpoint receives a downlink stream which is able to carry a mixture of the respective audio signals captured by the other telephone endpoints. Accordingly, when two or more participants in a telephone conference speak at the same time, the other participant(s) can hear both participants speaking.

It is known (and usually desirable) for the mixer to employ an adaptive approach whereby it changes the mixing in response to perceiving certain variations in one or more of the audio signals. For example, an audio signal may be omitted from the mixture in response to determining that it contains no speech (i.e. only background noise).

Consider a teleconferencing system in which telephone endpoints each send an uplink audio stream to a teleconferencing mixer. In such a system, the uplinks and downlinks may be encoded digitally and transmitted via a suitable packet-switched network, such as a voice over internet protocol (VoIP) network, or they may travel over a circuit-switched network, such as the public switched telephone network (PSTN). Either way, it is the mixer's responsibility to produce a downlink audio stream to send back to each endpoint such that, in general, each participant hears every other participant except himself.

One class of endpoint in such a system employs discontinuous transmission (DTX) on the uplink. Such an endpoint attempts to maximise intelligibility while minimising the use of network resources by one of more of: employing microphone placements close to the talkers' mouths; noise suppression signal processing which remove background noise; only sending the uplink stream when human speech is present.

This strategy may result in less aberrant noise being heard by the listener, but it may also result in a less natural-sounding experience, firstly because noise suppression signal processing typically results in the introduction of disturbing dynamic artefacts when the background noise is non-stationary, secondly because the noise suppression affects the equalisation of the speech and thirdly because the binary transmit/don't transmit decision, based on imperfect information from a voice activity detector (VAD), will sometimes lead to speech being cut off and at other times lead to residual noise being transmitted as speech. Thus, an audio stream received from a DTX device is an example of an audio input stream which is expected to include no more than a negligible amount of human-perceivable background noise.

A second class of endpoint employs continuous transmission (CTX) on the uplink. That is, a CTX endpoint sends an audio stream regardless of whether the VAD (if present) determines that speech is present or not. Here the intention is often to maximise the naturalness of the listening experience and allow a remote listener to perform the well-known cocktail party problem of binaural processing just as if he or she were present in person. Accordingly, a CTX endpoint may employ multiple microphones to retain spatial diversity to allow binaural release from masking. The designer of a CTX device may also seek to limit the amount of noise suppression processing that the device performs in order to minimise the potential for disturbing dynamic artefacts and spectral colouration. Thus, an audio stream received from a CTX device is an example of an audio input stream which is expected to include more than a negligible amount of human-perceivable background noise.

SUMMARY OF THE INVENTION

Generally, a DTX device seeks to remove, suppress or otherwise avoid transmitting anything it deems not to constitute human speech, whereas a CTX device seeks to be transparent, transmitting everything the most perceptually continuous and relevant manner possible. Any mixer must take this into account. Since a DTX endpoint's uplink is substantially silent when no speech is detected, a mixer may be able to freely discard its uplink stream when speech is not detected without perceptual consequence for the listener. However, when forming a downlink mix that contains a CTX stream, the mixer must be careful in how it applies mixing transitions to the stream. For example, discarding a CTX stream when talk is not detected may be readily noticed by a listener because the background noise associated with that stream may be heard to turn off, especially if no other CTX stream is present to mask the transition. The listener may be left wondering whether the system has failed, or whether the CTX endpoint has disconnected from the conference. The goal of providing a natural listening experience would not be met in such a case.

Generally, the goal of a teleconferencing mixer is to allow each participant to hear the speech from every other participant, but not from himself. There are, however, some nuances to this goal. For example, if many CTX streams, each containing background noise, are heard simultaneously by a listener, the total background noise power heard may increase to a point where it is distracting or detrimental to intelligibility. Consider as a further example where multiple uplink streams all talking at the same time. The result may be too cacophonous to facilitate useful communication.

Various inventive methods, devices, apparatus and systems disclosed herein provide an improved form of audio conferencing mixing.

In accordance with a first aspect of the present disclosure, there is provided in an audio teleconference mixing system, of the type mixing a first plurality of audio uplink input streams containing audio information including sensed audio and associated control information, to produce at least one audio downlink output stream for downlinking to at least one conference participants, wherein the audio uplink input streams potentially can include continuous transmission (CTX) and discontinuous transmission streams (DTX), a method of mixing multiple current audio uplink streams together to produce the at least one audio output stream, the method including the steps of: (a) determining a verbosity measure indicative of the likely importance of each current audio uplink streams; (b) where at least one current audio uplink stream can comprise a CTX stream, utilising at least one CTX stream in the mix to produce at least one current downlink output stream.

In some embodiments, the method includes the step of utilising the CTX steam having the highest verbosity measure in the mix to produce at least one current downlink output stream. Preferably, the step (b) further can comprise the step of: (i) where ancillary CTX streams are preferably present having no detected speech thereon, attenuating the ancillary CTX streams. Preferably, the step (b) further can comprise the step of: (ii) where the current CTX stream having the highest verbosity measure has no voice provided for an extended period of time, attenuating the current CTX stream.

In some embodiments, the method also includes the step of: (c) where the number of audio input streams exceeds a predetermined limit, discarding CTX streams having the lowest verbosity measures.

A second aspect of the present disclosure provides, in an audio teleconference mixing system, of the type which is configured to mix a plurality of audio input streams to thereby produce at least one audio output stream for sending to at least one telephone endpoint, a method of producing said at least one audio output stream based on the plurality of audio input streams. The method comprises: determining that the plurality of audio input streams comprises at least one audio input stream which is expected to include more than a negligible amount of human-perceivable background noise, referred to hereinafter as a "noise-carrying audio input stream", and that the noise-carrying audio input stream, or every one of the noise-carrying audio input streams, is an audio stream in which no speech is currently detected; and including the noise-carrying audio input stream, or at least one of the noise-carrying audio input streams, in said at least one audio output stream.

Whereas it may be considered counterintuitive to include in an audio output stream at least one audio input stream that contains audible background noise, even when said audio input stream does not include speech, the inventors realised that the presence of audible background noise may lead to 'ambience' (e.g. shuffling of papers, yawning, playing with pens, etc.) that provides a more natural listening experience.

In some embodiments, the method comprises: determining that the plurality of audio input streams comprises plural noise-carrying audio input streams, and that every one of the noise-carrying audio input streams is an audio stream in which no speech is currently detected; determining a respective measure of perceived importance for each of the noise-carrying audio input streams; selecting a subset of the noise-carrying audio input streams based on their respective measures of perceived importance; and including the subset of the noise-carrying audio input streams in said at least one audio output stream.

In some embodiments, the method comprises: selecting the one or more noise-carrying audio input streams with the highest measure of perceived importance; and including the selected noise-carrying audio input stream(s) in said at least one audio output stream.

A third aspect of the present disclosure provides, in an audio teleconference mixing system, of the type which is configured to mix a plurality of audio input streams to thereby produce at least one audio output stream for sending to at least one telephone endpoint, a method of producing said at least one audio output stream based on the plurality of audio input streams. The method comprises: determining that the plurality of audio input streams comprises at least one audio input stream which is expected to include no more than a negligible amount of human-perceivable background noise, referred to hereinafter as a "negligible-noise audio input stream", and that the negligible-noise audio input stream, or every one of the noise-carrying audio input streams, is an audio stream in which no speech is currently detected; and including the negligible-noise audio input stream, or at least one of the negligible-noise audio input streams, in said at least one audio output stream.

In some embodiments, the method comprises including all of the negligible-noise audio input streams in said at least one audio output stream. Whereas it may be considered counterintuitive to include all of the negligible-noise audio input streams in said at least one audio output stream, the inventors realised that this should not significantly impair the "naturalness" of a call, and not omitting such audio signals should lead to less swapping of audio signals.

A fourth aspect of the present disclosure provides, in an audio teleconference mixing system, of the type which is configured to mix a plurality of audio input streams to thereby produce at least one audio output stream for sending to at least one telephone endpoint, a method of producing said at least one audio output stream based on the plurality of audio input streams. The method comprises: determining that the plurality of audio input streams comprises more than a threshold number of noise-carrying audio input streams in which speech is currently detected; determining a respective measure of perceived importance for each of said noise-carrying audio input streams; selecting a subset of said noise-carrying audio input streams based on their respective measures of perceived importance; and including the subset of the noise-carrying audio input streams in said at least one audio output stream.

The inventors realised that the presence of too many (e.g., more than five) noise-carrying audio input streams in audio output stream will, in some cases, significantly impair the "naturalness" of a call.

In some embodiments, the method comprises: determining that the plurality of audio input streams further comprises a negligible-noise audio input stream in which speech is currently detected; and including the negligible-noise audio input stream, along with the subset of the noise-carrying audio input streams, in said at least one audio output stream.

In some embodiments, the method comprises: determining that the plurality of audio input streams further comprises plural negligible-noise audio input streams in which speech is currently detected; and including the negligible-noise audio input streams, along with the subset of the noise-carrying audio input streams, in said at least one audio output stream.

In some embodiments, determining the measure of perceived importance for an audio input stream comprises a measure indicative of how much speech the audio input stream has included during a current call. This may help with perceived continuity in the "ambience" heard by the participants.

In some embodiments, the noise-carrying audio input stream, or each of the noise-carrying audio input streams, is a continuous transmission (CTX) audio input stream.

In some embodiments, the negligible-noise audio input stream, or each of the negligible-noise audio input streams, is a discontinuous transmission (DTX) audio input stream.

A fifth aspect of the present disclosure provides an apparatus for use in a teleconference mixing system, the apparatus being configured to receive a plurality of audio input streams and to produce at least one audio output stream based on the audio input streams, the apparatus comprising a processor configured to carry out at least one of the methods described above.

A sixth aspect of the present disclosure provides a computer-readable medium carrying computer-interpretable instructions which, when executed by a processor of an apparatus for use in a teleconference mixing system, the apparatus being configured to receive a plurality of audio input streams and to produce at least one audio output stream based on the audio input streams, causes the apparatus to carry out at least one of the methods described above.

In various embodiments, a noise-carrying audio input stream will be faded out rather than abruptly omitted from the audio output stream(s), if it has not contained speech for more than a predetermined maximum time.

These and other aspects of the present disclosure may be appreciated from the following description of exemplary embodiments.

BRIEF DESCRIPTION OF THE DRAWINGS

Various embodiments will now be described, by way of example only, with reference to the accompanying drawings in which.

DETAILED DESCRIPTION

A preferred embodiment operates in an environment for audio teleconferencing (with or without an associated video stream) and provides a method for mixing multiple uplink streams to ensure efficient mixing of output signals in a CTX and DTX environment.

Figure 1:
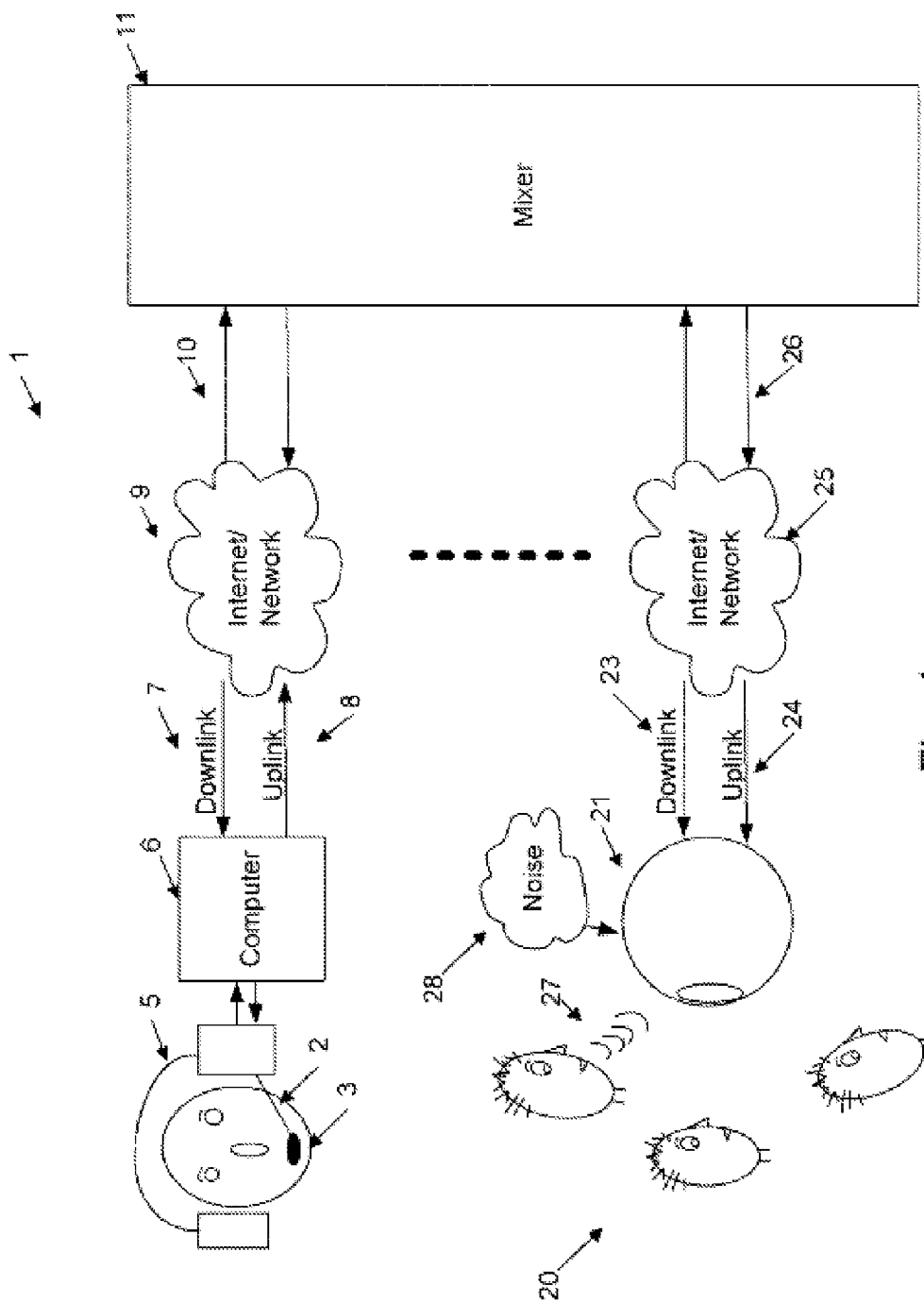
FIG. 1 illustrates schematically one form of adaptive mixing arrangement of a preferred embodiment.

An exemplary audio teleconferencing system is illustrated 1 in FIG. 1. In this arrangement a series of conference participants collectively provide audio input and output. For example, in the arrangement 1, a first participant 2 uses a pair of headphones 5 and input microphone 3 interconnected to computer 6 for conference participation. The computer 6 provides uplink 8 and downlink 7 connections over a network 9, with mixer 11.

A second group of participants e.g. 20 use audio device 21 which provides audio output including spatialization information. The audio device 21 also provides internal computational and communication abilities and includes uplink 23 and downlink 24 channels which interconnect via network 25 with mixer 11.

Additional participants can also be interconnected to the mixer 11 via other means.

The arrangement of FIG. 1 includes a plurality of conference participants 2 utilising DTX endpoints, exemplified by the binaural headset 5 with boom microphone 3. Each of said plurality of DTX endpoints asserts a DTX uplink stream 8 to the teleconferencing mixer 11, typically via a network 9. The mixer produces a downlink stream 7 for each DTX endpoint, which is transmitted back to the endpoint 2 over the network 9 to be heard by the participant 2.

Each of a plurality of CTX endpoints, exemplified by speakerphone device 21, captures the speech 27 of a further plurality of conference participants 20. Non-trivial background noise may also be captured by such devices. Each of the said plurality of CTX endpoints asserts a CTX uplink stream 24 to the mixer 11, typically via a network 25. Without loss of generality, network 25 may be the same network as that used by the DTX endpoints. The mixer 11 produces a downlink stream 23 for each CTX endpoint, which is transmitted back to the endpoint 21 over the network 25 for playback to a plurality of participants 20.

In the teleconferencing system, each of the participant endpoint sends an uplink audio stream to a teleconferencing mixer and receives a downlink stream therefrom. In such a system, the uplinks and downlinks may be encoded digitally and transmitted via a suitable packet-switched network, such as a voice over internet protocol (VoIP) network, or they may travel over a circuit-switched network, such as the public switched telephone network (PSTN). Either way, it is the responsibility of the mixer 11 to produce a downlink audio stream to send back to each endpoint 5, 21 such that, in general, each participant hears every other participant except himself.

There are, however, some nuances to this goal. For example, if many CTX streams, each containing background noise, are heard simultaneously by a listener, the total background noise power heard may increase to a point where it is distracting or detrimental to intelligibility. Consider as a further example multiple uplink streams all talking at the same time. The result may be too cacophonous to facilitate useful communication. It may be better to let only the two or three most perceptually relevant streams through in this case. Many authors, including the present authors, have proposed methods for achieving this. For example, European Patent Application EP 1 855 455 B1 to Enbom et al discloses one such methodology.

Whilst the mixer manages teleconference calls on demand, Error! Reference source not found. 2 illustrates schematically one illustrative form of teleconferencing mixer 11.

Figure 2:
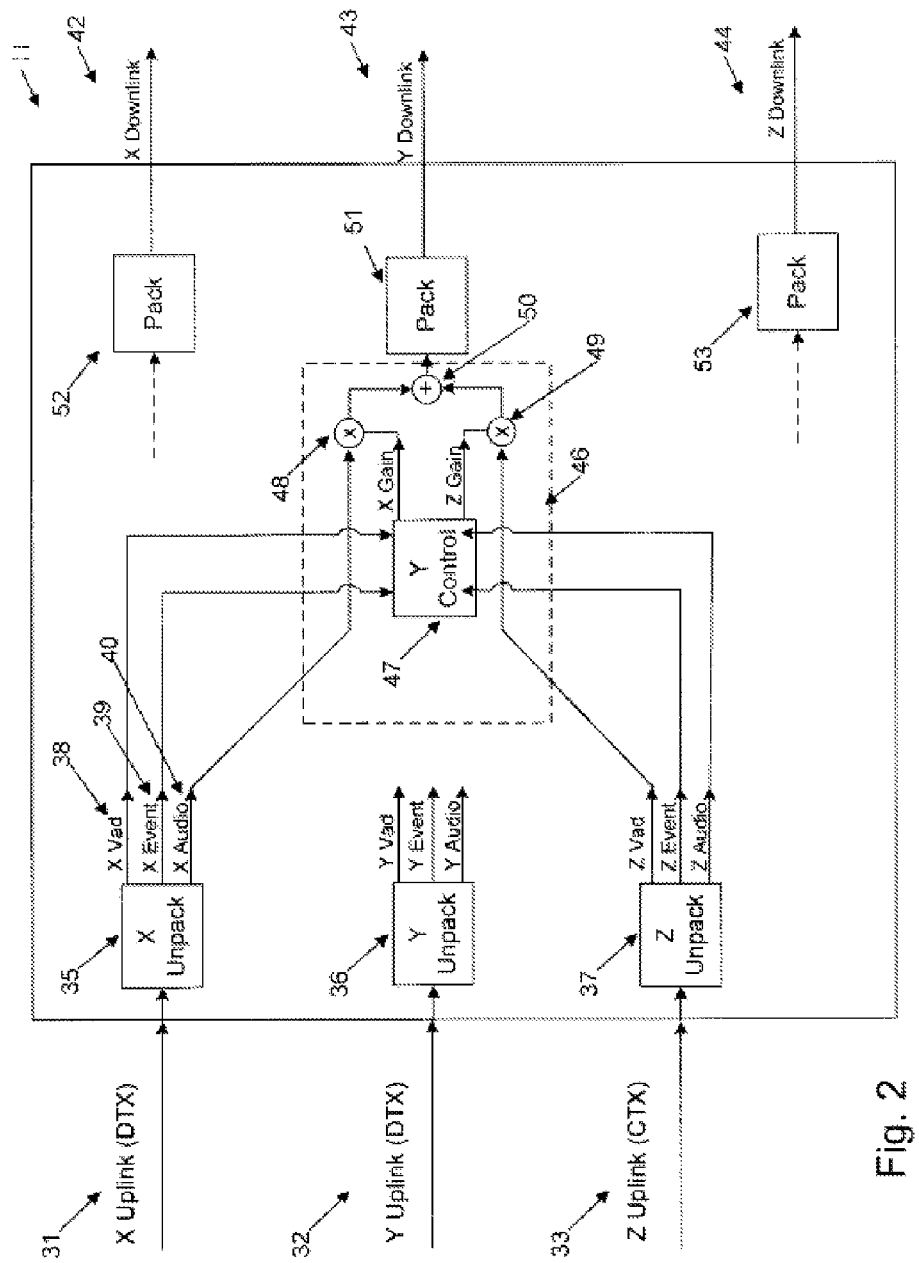
FIG. 2 illustrates schematically the teleconferencing mixer of a preferred embodiment.

As shown in FIG. 2, a plurality of uplink streams, some DTX (31, 32), some CTX (33), are asserted to the mixer 11. Each of the uplink streams passes through a respective unpack unit 35, 36, 37. Depending on the uplink encoding information, each unpack unit unpacks the respective uplink stream and extracts the VAD 38, making event information and audio information 40 from the uplink stream, and to identify masking events 39 as described below.

The mixer 11 produces a plurality of downlink streams 42, 43, 44. Shown in FIG. 2 is the sub mixing apparatus 46 associated with one of the downlink streams 43. Not shown is the respective similar sub mixing apparatus which exists for each of the other downlink streams 42, 44. The mixing control unit 47 for this downlink operates on the VAD and masking event signals produced by the unpack units 35, 37 associated with the other downlinks and produces a gain for each of the uplinks other than uplink 36, because downlink 43 will be heard by the same endpoint Y that generated uplink 32. These gains are used to scale 48, 49 and mix 50 the audio from the uplinks to produce a final audio stream suitable for repacking and encoding 51 back through the downlink 43.

The preferred embodiments provide a method for mixing together DTX and CTX uplinks in the teleconferencing system to form a serious of perceptually continuous downlinks with an overall unique mixing strategy.

Consider a VoIP (Voice over Internet Protocol) teleconferencing server which services a plurality of DTX endpoints (that is, endpoints that transmit audio on the uplink only when speech is estimated to be present) and a plurality of CTX endpoints (that is, endpoints that transmit audio on the uplink continuously). Periodically (e.g. every 20 ms) the server needs to analyse uplink packets of encoded audio that have been received over the network since the last time and produce a new downlink packet containing encoded audio to send to each endpoint. The uplink packets may not arrive at exactly the same rate that the server needs them (e.g. every 20 ms) because of drift between the clock on the sending endpoint and the clock on the server and because of jitter and packet loss introduced in the network. The server will therefore need to employ a jitter-buffering scheme as is known to those skilled in the art. After jitter-buffering, the downlink packets should be formed based on the input packets with the general goal that a listener at any of the endpoints hears speech from each of the other endpoints but not from himself.

The preferred embodiment provides a method which extends previous techniques by handling both DTX and CTX streams in a perceptually continuous manner according to the following principles.

Decisions on which streams are heard and which are not are based on a Verbosity metric, a metric which describes the importance of a particular uplink in the conversation. Different forms of characterisation of the verbosity metric or heuristic can be used, including simple measures such as power spectrum analysis of each channel. One more complex measure of verbosity is obtained in U.S. Patent Application 61/706,315, filed Sep. 27, 2012 entitled "Method for Improving Perceptual Continuity in a Spatial Teleconferencing System", the contents of which are hereby incorporated by cross reference.

When people talk it is desirable for them to be heard, unless extreme conditions prevail. Therefore, a CTX stream will be heard whenever the VAD associated with it estimates that speech is present in the stream, unless a certain maximum count N_MAX (e.g., 5) of CTX streams containing active speech is exceeded. In the case that more than N_MAX CTX streams contain speech simultaneously, the N_MAX CTX streams with the highest verbosity shall be heard—while others can be culled. If many CTX streams are heard, at once the result is likely to be cacophonous or noisy and can also consume significant server resources to mix.

It is desirable when none of the CTX streams contains active speech that, most of the time, a single CTX uplink is audible in each downlink. If CTX streams are abruptly switched off as soon as talk ceases, this will be immediately noticeable and will sound unnatural. On the other hand, if many CTX streams are heard at once the result could be distractingly cacophonous or noisy and will also consume significant server resources to mix.

In a preferred embodiment, it is desirable to have at least a single CTX stream active in each downlink at any time. This stream is denoted the presenter. It is logical to choose the most verbose (that is, highest verbosity) stream to be the presenter, since it is most likely to be the focus of attention for a listener, given that is the stream that has, in recent history, contained the most speech in the conference.

It is desirable that CTX streams be discontinued gracefully. This means that instead of just switching one off when no speech is present, the server should fade it out after waiting a certain minimum hold time to see if more speech is forthcoming. However, it is more important that people are heard. Therefore, this principle should not be applied when more than N_MAX CTX streams are active.

If none of the CTX streams has contained speech for a long period of time (e.g., 1 minute), it is possible to "step down" the last CTX stream heard. This can be done by applying a discrete attenuation step of magnitude G_STEP (e.g., −2 dB) each time a masking event is declared. A masking event is detected when an endpoint begins talking after a period of silence of length T_MASK (e.g., 3 seconds). Once the stream is attenuated by more than a certain amount e.g. G_THRESHOLD (e.g., −18 dB) it can be faded out and discontinued. A simple way to determine that a stream has been inactive for a long period of time is to check whether its verbosity sits below some small threshold V_THRESHOLD (e.g., 0.05).

Specific Embodiments

One form of specific embodiment of an implementation of the submixing unit 46 of FIG. 2 will now be described.

For every connected endpoint or downlink, maintain a scene object as state from frame to frame. A scene object can consist of: 1. A set of references to input streams (that is, uplink streams from other connected endpoints); 2. A set of output stream definitions, each of which in turn consists of: a) A set of references to assigned input streams; b) For each reference to an assigned input stream, as associated mix gain.

Periodically (e.g., every 20 ms):

1) Initialise set D (the set of input stream decodes that will need to be performed this frame) to the empty set.

2) Initialise set S (the set of scenes that will need to be mixed and re-encoded this frame) to the empty set.

3) Perform a preparation pass; for each connected endpoint:
   a) Fetch the next uplink audio packet from the jitter buffer.
   b) Determine whether speech is present in the audio packet (talk flag). This can be done by decoding the packet and applying a suitable VAD, or by extracting talk flag metadata that has been supplied in the audio packet by the sending endpoint.

4) Perform a verbosity update pass; for each connected endpoint:
   Update the verbosity metric for this endpoint based on the talk flags. Since verbosity is a long term aggregate, it is also acceptable to use the talk flags from the previous frame so that verbosity can be calculated as part of the first pass.

5) Perform a planning pass; for each connected endpoint, update a scene object:
   a) In the first subpass it is necessary to determine which input streams to enable:
     i. Record the number, n_ctx, of CTX input streams that have their talk flag asserted.

ii. Create a set L of no more than N_MAX most verbose (that is, highest verbosity) input streams with talk flags currently asserted.
iii. Record the number, n_cull, of input streams that have their talk flag set but are not members of set L.
iv. Find which of the CTX input streams, if any, currently has the highest verbosity that is at least V_THRESHOLD. Designate this stream the presenter.
v. If the talk flag of any of the input streams has gone from cleared to asserted this frame after a period of at least T_MASK of inactivity, declare a masking event associated with this scene.

b) In the second subpass it is necessary to enable input streams in the scene. For each input stream in set L:
i. Set the mix gain to 0 dB (unity).
ii. Ensure the input stream is assigned to an output stream. If multiple input streams are assigned to the same output stream they can be decoded and mixed at the server. Any output stream that has only a single input stream assigned to it can be forwarded without decoding. An output packet may contain multiple output streams, in which case they are mixed together and rendered at the receiving endpoint.

c) In the third subpass a cull of the input streams that were previously heard from the scene is undertaken. For each input stream currently assigned to an output stream but not a member of set L:
i. If the input stream is DTX, immediately unassign it from its output stream.
ii. If the input stream is CTX and n_cull is non-zero, mark this stream as fading in this output stream. Otherwise:
iii. If the input stream is not designated as the presenter, n_ctx is greater than one and the stream has been inactive for at least T_HOLD, mark this input stream as fading in its output stream.
iv. If the input stream is not designated as the presenter and n_ctx is one (this is the only CTX stream currently heard, but it is not the presenter), reduce its mix gain by G_STEP if a masking event has been declared. If the mix gain is now less than G_THRESHOLD, mark this input stream as fading in its output stream.

d) In the fourth subpass, an update is made of the gain of streams that are fading. For each input stream currently assigned to an output stream:
i. If the input stream is marked fading, reduce its mix gain by G_FADE.
ii. If the input stream's mix gain is less than G_CUT, unassign it from the output stream.
iii. In the fifth subpass we add any input stream decodes that will need to be performed in order to mix the scene to set D if they are not already members.
iv. If the resulting scene is not empty, add it to set S.

6) Optionally, perform a scene sharing pass by locating and merging identical scenes in set S. Two scenes should be considered identical if each output stream is to be formed from the same set of input streams with the same mix gains. Identical scenes should be merged into a single scene object which records which endpoints it should be sent to.

7) Perform each of the input stream decodes in set D so that decoded audio data is available for mixing.

8) Perform a mixing pass; for each scene in S:
(a) For each output stream in the scene:
  i. If the output stream has multiple input streams assigned to it then mix together the decoded audio derived from the input streams in the decode pass (7), and reencode the mixed audio ready for transmission in the downlink packet.
  ii. Otherwise, if the output stream has a single input stream assigned to
  it: Copy or refer to the input stream ready for transmission in the downlink packet without reencoding.

9) Perform a sending pass; for each scene in S, and for each endpoint that is to receive this scene:
(a) Form a complete downlink packet by prepending the output stream data produced in the mixing pass (8) with any required endpoint-specific header information (e.g., sequence number).
(b) Send the downlink packet to the endpoint.

10) On receiving a downlink packet, an endpoint should decode each of the streams found therein, mix them together and render them over loudspeakers or headphones.

Assuming a 20 ms frame period, recommended values for each of the constants shown in ITALIC CAPITALS in the above discussion are given in the following table.

| | |
|---|---|
| N_MAX | 5 |
| V_THRESHOLD | 0.05 |
| T_MASK | 3 seconds |
| T_HOLD | 1 second |
| G_STEP | −2 dB |
| G_THRESHOLD | −18 dB |
| G_FADE | −20 dB/second (0.4 dB/frame) |
| G_CUT | −60 dB |

Figure 3:
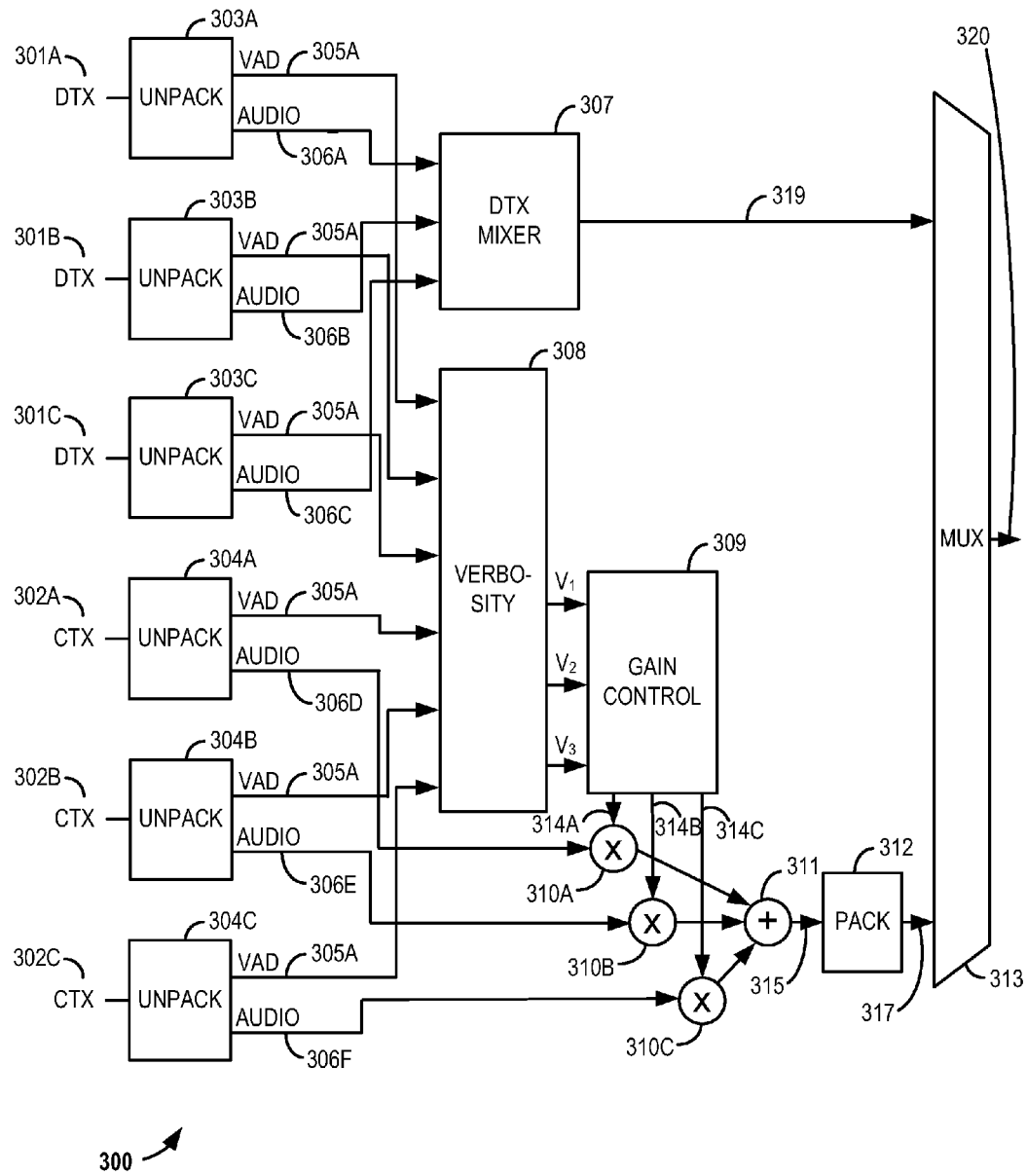
FIG. 3 is a block diagram that shows examples of teleconferencing mixer elements.

FIG. 3 is a block diagram that shows examples of teleconferencing mixer elements. The types and numbers of components shown in FIG. 3 are merely shown by way of example. Alternative implementations may include more, fewer and/or different components. The teleconferencing mixer 300 may, for example, be an instance of a teleconferencing server. In some examples, the teleconferencing mixer 300 may be a component of another device. For example, in some implementations the teleconferencing mixer 300 may be a component of a teleconferencing server, e.g., a line card. The teleconferencing mixer 300 may be implemented, at least in part, by a control system that may include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the teleconferencing mixer 300 may be implemented according to instructions (e.g., software) stored on one or more non-transitory media. Such non-transitory media may include memory devices such as those described herein, including but not limited to random access memory (RAM) devices, read-only memory (ROM) devices, etc.

In the example shown in FIG. 3, the teleconferencing mixer 300 includes unpack units 303A-303C, which are shown receiving DTX uplink streams 301A-301C. Here, the teleconferencing mixer 300 also includes unpack units 304A-304C, which are shown receiving CTX uplink streams 302A-302C. In some implementations, the unpack units 303A-303C may be instances of the unpack units 35 and 36 that are FIG. 2 and described above and the unpack units 304A-304C may be instances of the unpack unit 37 that is FIG. 2 and described above.

Although neither the unpack units 303A-303C nor the unpack units 304A-304C are shown outputting event information (such as the X event, Y event and Z event information shown in FIG. 2), in some implementations the unpack units 303A-303C and/or the unpack units 304A-304C may be capable of determining events in received uplink streams and of outputting event information. According to some such implementations, the unpack units 303A-303C and/or the unpack units 304A-304C may be capable of determining events according to event flags (or similar indications) in received uplink streams. Alternatively, or additionally, in some implementations the unpack units 303A-303C and/or the unpack units 304A-304C may be capable of determining events by other means, such as by analysis of the received uplink streams.

Some such examples may include a feature extractor and an event detector. In some implementations, both the feature extractor and the event detector may be implemented in an unpack unit or in one or more other components of a teleconferencing mixer. In alternative implementations, both the feature extractor and the event detector may be implemented in a telephone endpoint. In yet other implementations, the feature extractor may be implemented in a telephone endpoint and the event detector may be implemented in an unpack unit or in one or more other components of a teleconferencing mixer.

The feature extractor may be capable of analysing input waveforms and producing output corresponding to one or more types of features, such as changes in level and/or changes in the spectral flux (e.g., changes in the pitch). In some examples, the feature extractor may be capable of VAD functionality. According to some such examples, the feature extractor may be capable of analysing input waveforms and of outputting VAD results.

The event detector 402 may be capable of analysing the features extracted by the feature extractor and of producing output corresponding to one or more types of events. In some implementations, the events may correspond with the onset of speech, the cessation of speech, the presence of particular syllables, words or classes of speech, changes in the volume level, spectral flux, or other such heuristics, and/or criteria determined according to auditory scene analysis. In some implementations, the output of the event detector may be "binary," indicating only whether an event is, or is not, present. However, in some examples, the output of the event detector also may indicate an event magnitude.

According to some examples, the unpack units 303A-303C may be capable of processing only DTX uplink streams and the unpack units 304A-304C may be capable of processing only CTX uplink streams. However, in some implementations, the unpack units 303A-303C and/or the unpack units 304A-304C may be capable of processing both CTX and DTX uplink streams. According to some such implementations, the unpack units 303A-303C and/or the unpack units 304A-304C may be capable of determining whether to process an uplink stream as a CTX or a DTX uplink stream according to a flag, a header or other information in the uplink stream. In some implementations, information regarding whether to process an uplink stream as a CTX or a DTX uplink stream may be outside of the uplink stream. In some such implementations, information regarding whether to process an uplink stream as a CTX or a DTX uplink stream may be exchanged during a session initiation process, e.g., during a negotiation between an endpoint and a teleconferencing server (or a portion thereof, such as an unpack unit) according to Session Initiation Protocol (SIP). Alternatively, information regarding whether to process an uplink stream as a CTX or a DTX uplink stream may not be explicitly indicated within an uplink stream or during a session initiation process, but may be determined according to an analysis of information, such as VAD flags, in packets of an uplink stream. In one such example, a CTX uplink stream may be identified by an instance of two VAD flags of two consecutive packets being set to zero.

According to some implementations, the number of unpack units will depend on the number of uplink streams and the functionality of the unpack units will depend on whether the uplink streams are CTX or DTX uplink streams. For example, in some such implementations, a control system may invoke a number of software modules corresponding to the number of uplink streams. Each of the software modules may have unpack unit functionality that depends on whether the corresponding uplink stream is a CTX or a DTX uplink stream.

In the example shown in FIG. 3, the unpack units 303A-303C and the unpack units 304A-304C are capable of outputting audio information 306A-306F, each of which is from a corresponding uplink stream. The audio information 306A-306F may be in the time domain or the frequency domain, depending on the particular implementation. In some examples the audio information 306A-306F may be modified discrete cosine transform (MDCT) audio data. The audio information 306A-306F may be encoded or decoded, depending on the particular implementation. In this example, at least the audio information 306D-306F may be decoded.

In this example, the unpack units 303A-303C and the unpack units 304A-304C are capable of outputting voice activity information 305A-305F, indicating speech in a corresponding uplink stream. In some implementations, DTX endpoints will only send an uplink stream when the DTX endpoints have detected speech. According to some such examples, the unpack units 303A-303C may be capable of capable of outputting voice activity information corresponding to time intervals during which DTX uplink streams are received.

In some implementations, a CTX endpoint may be capable of voice activity detection and may include information in a CTX uplink stream, such as a VAD flag, indicating which parts of the audio data in the CTX uplink stream correspond to speech. According to some such examples, the unpack units 304A-304C may be capable of outputting voice activity information corresponding to detected VAD flags or other such information in the CTX uplink streams 302A-302C. However, in alternative examples, the unpack units 304A-304C may be capable of voice activity detection and may be capable of outputting voice activity information corresponding to detected speech in the CTX uplink streams 302A-302C.

In this example, the unpack units 303A-303C and the unpack units 304A-304C are capable of outputting voice activity information 305A-305F to a verbosity estimator module 308. Accordingly, in this implementation voice activity information from all of the uplink streams involved in a teleconference is input to the verbosity estimator module 308. In this example, the verbosity estimator module 308 is capable of computing a verbosity metric for CTX endpoints, such as the three CTX endpoints corresponding to the CTX uplink streams 302A-302C. As noted elsewhere herein, the verbosity metric may indicate the likely importance of an uplink stream.

The process of computing the verbosity metric and/or the verbosity metric itself may vary according to the implementation. In some implementations, the verbosity estimator module 308 may be capable of computing a verbosity metric based, at least in part, on a power spectrum analysis of each uplink stream. In some implementations, the verbosity estimator module 308 may be capable of computing a verbosity metric according to one or more methods described in International Patent Application No. PCT/US2013/061648 filed 25 Sep. 2013, e.g., on pages 24-29, the contents of which are hereby incorporated by reference.

Some such implementations may involve accumulating the verbosity metric of each input soundfield signal (e.g., of each conversational participant or of each uplink stream) over time. Such implementations may involve determining verbosity values $V_i$ for the input soundfield signals of each endpoint i. The verbosity values $V_i$ may be modified depending on the activity in the conference. A relatively high value of $V_i$ may indicate that the endpoint i has been more active, and thus is more likely or suitable to be sustained as a recently active soundfield in the multiplexed output soundfield signal. The verbosity metric $V_i$ may be modified at each frame or time instant according to a set of rules and parameters. Examples of rules and parameters are listed in Table 1, below. In particular, Table 1 illustrates mechanisms and suggested changes to the verbosity metric.

TABLE 1

| Symbol | Description | Range | Suggested |
|---|---|---|---|
| $h_g$ | Hold time before increasing V when activity commences | 0 ... 2 s | 200 ms |
| $h_n$ | Hold time before decreasing V when activity ceases | 0 ... 10 s | 500 ms |
| $p_v$ | Increase to V when active beyond the hold time $h_v$ | 0 ... 1 | +0.05/s |
| $p_s$ | Increase to V when endpoint is the only active endpoint beyond the hold time $h_v$ | 0 ... 1 | +0.1/s |
| $m_v$ | Decrease to V not active beyond the hold time $h_n$, when a plorality of other endpoints is active | 0 ... 1 | −0.1/s |
| $m_s$ | Decrease to V not active beyond the hold time $h_n$, when exactly one other endpoint is active | 0 ... 1 | −0.4/s |
| $m_0$ | Decrease to V not active beyond the hold time $h_n$, when no other endpoints are active | 0 ... 1 | 0.0/s |

Generally, from the above set of parameters, verbosity $V_i$ for an endpoint i may be increased when the endpoint i is active, and increased faster if endpoint i is the only active endpoint. Verbosity $V_i$ may be decreased when the endpoint i is inactive, and at least one other endpoint is active. Verbosity $V_i$ may be decreased faster if there is only one active endpoint. In the case of no activity in the conference, the present verbosity levels may be maintained in some examples. In some embodiments, it may be preferable to apply an appropriate decay of the Verbosity $V_i$ and link the decay to a fading-out of the associated soundfield signal of endpoint i.

According to some examples, if a first conference participant has been talking more than the other conference participants during a first time interval and then stops talking during a second time interval, but during the second time interval no other conference participant is talking, the verbosity of the first conference participant may remain constant during the time interval. However, if another conference participant starts talking during the second time interval, the verbosity of the first conference participant may decrease during the time interval. According to some implementations, the verbosity of the first conference participant may decrease faster during the second time interval if more than one other conference participant starts talking during the second time interval.

In the example shown in FIG. 3, the verbosity estimator module 308 is shown outputting verbosity metrics V1-V3, each of which corresponds to one of the CTX uplink streams 302A-302C. In some implementations, the verbosity estimator module 308 may be capable of outputting a number between 0 (meaning that a conversational participant has not spoken at all for at least a predetermined length of time) and 1 (meaning that a conversational participant has been the most dominant talker for at least a predetermined length of time).

According to this example, the verbosity metrics V1-V3 are being input to the gain control unit 309. In this implementation, the gain control unit 309 is capable of determining a mixing strategy, which includes a gain for each of the CTX uplink streams 302A-302C that is based, at least in part, on the verbosity metrics V1-V3. Here, the gain control unit 309 is capable of providing gain information 314A-314C, corresponding to the verbosity metrics V1-V3, to the corresponding gain units 310A-310C. Accordingly, in this example the gain control unit 309 may determine a relatively higher gain for a CTX uplink stream having a relatively higher verbosity metric and may determine a relatively lower gain for a CTX uplink stream having a relatively lower verbosity metric.

The mixing strategy also may be based on other factors. For example, in the example shown in FIG. 3, only a single downlink stream 320 is shown being output from the multiplexer 313 for the sake of simplicity. The downlink stream 320 corresponds to a single endpoint involved in a teleconference. The teleconferencing mixer 300 would generally output a plurality of downlink streams, one for each endpoint involved in a teleconference. In some implementations, the teleconferencing mixer 300 may be capable of allowing each conference participant to hear the speech from every other conference participant (with some possible constraints), but not from herself or himself. Accordingly, in some such implementations the mixing strategy also may involve determining a low (or zero) gain for a CTX uplink stream from an endpoint that corresponds to the downlink stream 320.

In some examples, the gain control unit 309 may be capable of providing functionality similar to that of the mixing control unit 47 described above with reference to FIG. 2. According to some such examples the gain control unit 309 may be capable of implementing, at least in part, the various aspects of this disclosure that are described above. For example, in some implementations the gain control unit 309 may be capable of attenuating one or more CTX uplink streams, discarding one or more CTX streams, including a noise-carrying CTX uplink stream in an output stream even if no speech is currently detected in the input stream, including a subset of the noise-carrying CTX uplink streams in which speech is currently detected in an output stream, including a negligible-noise CTX uplink stream in an output stream even if no speech is currently detected in the CTX uplink stream, etc., according to various criteria such as those disclosed herein. Although in the example shown in FIG. 3 the gain control unit 309 is not shown receiving event information from the unpack units, in alternative examples the gain control unit 309 may determine the mixing strategy based, at least in part, on event signals produced by the unpack units.

In this example, the corresponding gain units 310A-310C are capable of applying a gain to a corresponding one of the CTX uplink streams, based on the gain information provided by the gain control unit 309. In this implementation, the CTX mixer 311 is capable of mixing the CTX uplink streams output from the gain units 310A-310C. In some examples, the CTX mixer 311 may be capable of providing functionality similar to that of the mixing unit 50 described above with reference to FIG. 2.

In this implementation, the CTX mixer 311 is capable of providing a mixed CTX stream 315 to the re-encoding/repacking unit 312. The re-encoding/repacking unit 312 may be capable of encoding the mixed CTX stream 315 and of providing a mixed encoded CTX stream 317 to the multiplexer 313.

In the example shown in FIG. 3, the DTX mixer 307 receives the audio information 306A-306C, which corresponds to the DTX uplink streams 301A-301C, from the unpack units 303A-303C. In some implementations, the audio information 306A-306C may be encoded, whereas in other implementations the audio information 306A-306C may be decoded.

According to some implementations, the DTX mixer 307 may allow up to a maximum number of encoded DTX streams to be included in the downlink stream 320. In some such implementations, the DTX mixer 307 may assign each of the encoded DTX streams an associated location in virtual space. According to some implementations, the DTX mixer 307 may be capable of assigning conference participant speech to locations in virtual space according to a set of rules, such as those described in International Application Number PCT/US2013/033270, entitled "Placement of Talkers in 2D or 3D Conference Scene," e.g., on pages 1-10 and 22-36. In the implementation shown in FIG. 3, the multiplexer 313 is capable of providing a mixed DTX stream 319 to the multiplexer 313. In this example, the multiplexer 313 is capable of multiplexing the mixed encoded CTX stream 317 with the mixed DTX stream 319, to produce the downlink stream 320.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. In an audio teleconference mixing system, of the type mixing a first plurality of audio uplink input streams containing audio information including sensed audio and associated control information, to produce at least one audio downlink output stream for downlinking to at least one conference participant, wherein said audio uplink input streams potentially include continuous transmission (CTX) and discontinuous transmission (DTX) streams, a method of mixing multiple current audio uplink streams together to produce said at least one audio output stream, the method including the steps of:
   (a) determining a verbosity measure indicative of the likely importance of each of the current audio uplink streams; and
   (b) where at least one of the current audio uplink streams comprises a CTX stream, utilising at least one CTX stream in the mix to produce said at least one audio output stream.

2. A method as claimed in claim 1 further comprising in step (b), the step of utilising the CTX steam having the highest verbosity measure in the mix to produce at least one current downlink output stream.

3. A method as claimed in claim 1 wherein the step (b) further comprises the step of:
   (i) where ancillary CTX streams are present having no detected speech thereon, temporally attenuating the ancillary CTX streams.

4. A method as claimed in claim 3 wherein the step (b) further comprises the step of:
   (ii) where the current CTX stream having the highest verbosity measure has no voice provided for an extended period of time, temporally attenuating the current CTX stream.

5. A method as claimed in claim 1 further comprising the step of:
   (c) where the number of audio input streams exceeds a predetermined limit, discarding CTX streams having the lowest verbosity measures.

6. In an audio teleconference mixing system, of the type which is configured to mix a plurality of audio input streams to thereby produce at least one audio output stream for sending to at least one telephone endpoint, a method of producing said at least one audio output stream based on the plurality of audio input streams, the method comprising:
   determining that the plurality of audio input streams comprises at least one audio input stream which is expected to include more than a negligible amount of human-perceivable background noise, referred to hereinafter as a "noise-carrying audio input stream", and that the noise-carrying audio input stream, or every one of the noise-carrying audio input streams, is an audio stream in which no speech is currently detected; and
   including the noise-carrying audio input stream, or at least one of the noise-carrying audio input streams, in said at least one audio output stream.

7. The method of claim 6, comprising:
   determining that the plurality of audio input streams comprises plural noise-carrying audio input streams, and that every one of the noise-carrying audio input streams is an audio stream in which no speech is currently detected;
   determining a respective measure of perceived importance for each of the noise-carrying audio input streams;
   selecting a subset of the noise-carrying audio input streams based on their respective measures of perceived importance; and
   including the subset of the noise-carrying audio input streams in said at least one audio output stream.

8. The method of claim 7, comprising:
   selecting the one or more noise-carrying audio input streams with the highest measure of perceived importance; and
   including the selected noise-carrying audio input stream(s) in said at least one audio output stream.

9. The method of claim 7 wherein determining the measure of perceived importance for an audio input stream comprises a measure indicative of how much speech the audio input stream has included during a current call.

10. The method of claim 7 wherein the noise-carrying audio input stream, or each of the noise-carrying audio input streams, is a continuous transmission (CTX) audio input stream.

11. In an audio teleconference mixing system, of the type which is configured to mix a plurality of audio input streams to thereby produce at least one audio output stream for sending to at least one telephone endpoint, a method of producing said at least one audio output stream based on the plurality of audio input streams, the method comprising:
   determining that the plurality of audio input streams comprises more than a threshold number of noise-carrying audio input streams in which speech is currently detected;
   determining a respective measure of perceived importance for each of said noise-carrying audio input streams;
   selecting a subset of said noise-carrying audio input streams based on their respective measures of perceived importance; and
   including the subset of the noise-carrying audio input streams in said at least one audio output stream.

12. The method of claim 11, comprising:
   determining that the plurality of audio input streams further comprises a negligible-noise audio input stream in which speech is currently detected; and
   including the negligible-noise audio input stream, along with the subset of the noise-carrying audio input streams, in said at least one audio output stream.

13. The method of claim 12, comprising:
   determining that the plurality of audio input streams further comprises plural negligible-noise audio input streams in which speech is currently detected; and
   including the negligible-noise audio input streams, along with the subset of the noise-carrying audio input streams, in said at least one audio output stream.

14. The method of claim 11 wherein determining the measure of perceived importance for an audio input stream comprises a measure indicative of how much speech the audio input stream has included during a current call.

15. The method of claim 11 wherein the noise-carrying audio input stream, or each of the noise-carrying audio input streams, is a continuous transmission (CTX) audio input stream.

16. The method of claim 12 wherein the negligible-noise audio input stream, or each of the negligible-noise audio input streams, is a discontinuous transmission (DTX) audio input stream.

* * * * *